Feb. 21, 1956  G. WALTHER  2,735,951
DRIVING MECHANISM FOR OFFICE MACHINES
Filed Sept. 17, 1953
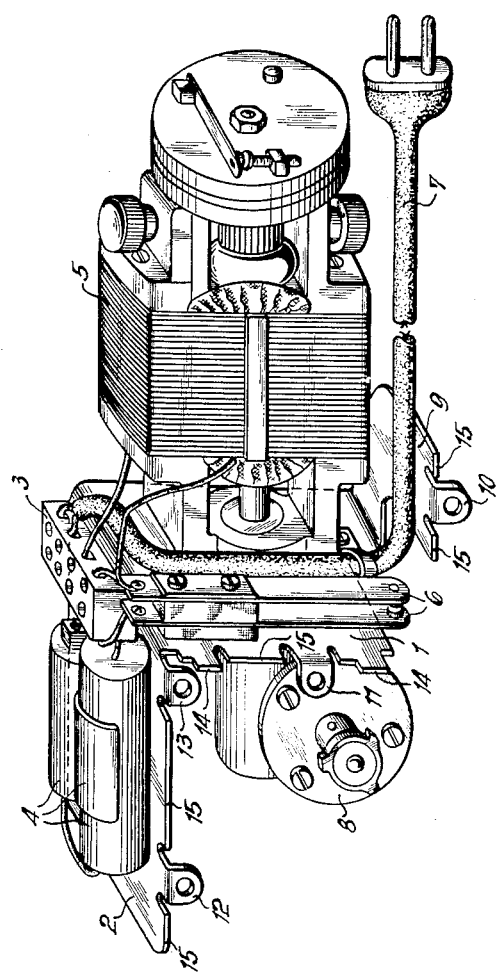
INVENTOR
GEORG WALTHER,
BY Robert B Pearson
ATTORNEY

United States Patent Office 2,735,951
Patented Feb. 21, 1956

2,735,951
DRIVING MECHANISM FOR OFFICE MACHINES

Georg Walther, Gerstetten, Germany

Application September 17, 1953, Serial No. 380,781

1 Claim. (Cl. 310—91)

The present invention relates to motor driven office machinery, such as calculating machines or the like, and more particularly to the driving mechanism for such machines.

It is the principal object of the present invention to devise a driving mechanism which, including all the necessary electrical appliances therefor, can be quickly and easily connected to, and disconnected from, a machine of this type, and wherein breakdowns, jamming, and other disorders of the machine which are caused by a deformation or dislocations of the motor supporting structure are avoided.

A main feature of the present invention therefor resides in the novel arrangement of the driving motor together with its speed reduction gearing, the control switch for operating the motor, and all other current conducting elements on a single support which can be easily secured to, or disconnected from, the side wall of the machine.

Another important feature of the invention resides in making the entire driving and electrical control mechanism of such a machine in the form of a single independent unit which can be built and checked for proper operation separately from the machine itself.

Another feature of the invention consists in making the bracket for supporting the motor, the reduction gearing, and all the necessary electrical appliances of a metal plate which is bent several times at a right angle in longitudinal direction, such angular shape of the bracket permitting a very close but easily accessible arrangement of the various elements mounted thereon, as well as great studiness of construction which prevents any dislocation of the individual elements relative to each other as well as to the respective machine to be driven.

More specifically, the supporting bracket according to the invention is made of a Z-shaped form and the individual elements are arranged thereon so that the upper horizontal section carries the suppressor elements and the terminal block for the electrical connections, while the middle vertical section carries on one side thereof the reduction gearing and on the other side the motor as well as the control switch thereof. All these sections of the bracket have extensions along their outer edges which fit into corresponding apertures in the side wall of the respective machine, as well as angular projections for rigidly securing the driving mechanism to such wall.

Further objects and features of the present invention will appear from the following description thereof and the accompanying drawing showing a perspective view of one embodiment of the invention.

As shown in the drawing, the bracket support consists of a plate which is bent several times in longitudinal direction into a substantially Z-shaped form, thus consisting of a vertical section 1 merging into an upper horizontal section 2 and a lower horizontal section 9. The upper section 2 carries the terminal block 3 and the suppressor elements 4, while the vertical section 1 carries on one side the speed reduction gear 8. The lower section 9 serves for bracing and additionally securing the bracket and the various elements thereon relative to the respective machine, and for this purpose it is provided on its forward edge with an angular flange 10 which is adapted to rest on the side wall of the machine and to be secured thereto by a bolt inserted through the bore thereof. Similar flanges 11, 12, and 13 are provided for the same purpose on the upper section 2 and the middle section 1, which also has extensions 14 thereon of such length as to fit into corresponding apertures in the side wall of the machine for easily locating the correct position of the bracket on such side wall when it is to be mounted thereon, and for additionally bracing it relative thereto. Shorter extensions 15 projecting only slightly from the outer surface of the flanges 10 to 13 are provided on all other forward edge portions of the bracket for properly spacing it from the side wall of the machine. The size and contour of these extensions 15 can be easily corrected by bending or filing them so that the bracket will properly fit on the side wall of the machine independently of the tension of the mounting bolts and even if the holes in the flanges 10 to 13 should not properly correspond with those in the side wall of the machine. The position of the bracket and the driving mechanism thereon can thus be accurately fixed relative to the machine to permit an accurate transmission of the driving power thereto. Even after the bracket with the driving mechanism thereon has been removed from the machine for any purpose whatever, it can be easily refitted and secured thereto in exactly the same position without requiring any securing means for the current conducting parts to be loosened and retightened.

Various modifications may be made without departing from the scope of the present invention as limited by the appended claims. For example, instead of being bent so as to form a Z-shape, the bracket may be of a U-shape, and instead of being made of an originally flat plate which is then bent into the desired angular form, it may be readily cast.

I claim:

A motor driven unit for operating an office machine having side walls, comprising an electric motor, a speed reduction gear connected to said motor, and a bracket of substantially Z-shaped form including upper and lower horizontal sections and a vertical section connecting the same, said electrical means including a control switch for operating said motor, and suppressor means, and a terminal block, said suppressor means and terminal block being mounted on the upper section of said bracket, said gear mounted on one side of said vertical section and said motor and control switch on the other side thereof, all of said bracket sections having extensions and angular flanges on one edge thereof, some of said extensions adapted to fit into corresponding apertures in one of the side walls of said machine, the other extensions adapted to rest against said side wall, said angular flanges adapted to be secured to said side wall for mounting the entire unit thereon.

References Cited in the file of this patent

UNITED STATES PATENTS

| 2,025,264 | Beam | Dec. 13, 1935 |
| 2,298,155 | Perkins | Oct. 6, 1942 |
| 2,322,921 | Carlson | June 29, 1943 |
| 2,317,922 | Lear | Apr. 27, 1943 |
| 2,563,562 | Stone | Aug. 7, 1951 |

FOREIGN PATENTS

| 367,822 | Great Britain | Feb. 15, 1932 |